United States Patent Office 3,494,877
Patented Feb. 10, 1970

3,494,877
POLYMERIZING AROMATIC HYDROCARBONS BY REGENERATIVE OXIDATION COUPLING
Ludo K. Frevel, Midland, Leonard J. Kressley, Saginaw, and Edwin J. Strojny, Midland, Mich., assignors to The Dow Chemical Company, Midland, Mich., a corporation of Delaware
No Drawing. Filed Feb. 28, 1968, Ser. No. 708,759
Int. Cl. C08g *33/00*
U.S. Cl. 260—2
9 Claims

ABSTRACT OF THE DISCLOSURE

A process for polymerizing aromatic hydrocarbons which comprises contacting them with a palladium catalyst and a metal sulfate oxidizing agent, in the presence of $H_2SO_4$, under sufficient pressure to maintain a liquid phase.

BACKGROUND OF THE INVENTION

Polymerizing aromatic hydrocarbons by oxidation coupling is well known in the art. Kovacic and Kyriakis (Tetrahedron Letters, 11, 467 (1962)) reported the use of an $AlCl_3$—$H_2O$—$CuCl_2$ catalyst to polymerize benzene. They also reported that $FeCl_3$ can be used as both the catalyzing and oxidizing agent. This latter observation was more fully reported by Kovacic and Koch (J. Org. Chem., 28, 1864 (1963)).

Kovacic and Lange (J. Org. Chem., 29, 2416 (1964)) reported a similar catalyst system for the production of dimers and trimers in a one-step procedure using $AlCl_3$—$CuCl_2$, $FeCl_3$ or $MoCl_5$. This system required a high catalyst/oxidizer ratio.

Van Helden and Verberg (Rec. Trav. Chim., 84, 1263 (1965)) reported an aromatic coupling system which used sodium acetate, $PdCl_2$ and acetic acid to couple monomers. The $Pd^{2+}$ ion was reduced to $Pd°$ during catalysis, which then had to be isolated and removed. The system produced low polymer yields and required a complicated removal and separation system. This system is patented in U.S.P. 3,145,237, which teaches a coupling system for producing biphenyl or substituted biphenyl utilizing a salt of palladium or platinum and an acid, at from 40° to 200° C., in the presence of an acid acceptor or a buffering agent, under substantially anhydrous conditions.

SUMMARY OF THE INVENTION

The instant invention is an unexpectedly improved method for polymerizing aromatic hydrocarbons by regenerative oxidation coupling which comprises contacting a hydrocarbon or substituted hydrocarbon of the benzene or naphthalene series, wherein any substituents are inert, with a catalyst system made up of palladium and a soluble metal sulfate capable of oxidizing $Pd°$ to $Pd^{2+}$, in an aqueous system containing $H_2SO_4$, under sufficient pressure to maintain the reaction in a liquid phase.

The monomers that lend themselves to this method are those hydrocarbons of the benzene or naphthalene series wherein any substituents are inert in the process. Suitable materials include benzene; alkylbenzenes, having preferable one to eight carbon atoms in each alkyl group, such as toluene, hexylbenzene and xylene; benzoic acid; alkylbenzoic acids, preferably having from one to eight carbon atoms in each alkyl group, such as ethylbenzoic acid, propylbenzoic acid and octylbenzoic acid; hydroxyaromatic compounds, such as phenol, cresol, resorcinol and salicylic acid; N,N-dialkylanilines, preferably having from one to eight carbon atoms in each alkyl group, such as dimethylaniline, dibutylaniline and dioctylaniline; alkyl phenyl ethers, preferably having from one to eight carbon atoms in the alkyl group, such as methyl phenyl ether, butyl phenyl ether and p-methoxyethoxybenzene; biphenyl; alkylbiphenyls, preferably having from one to eight carbon atoms in the alkyl group, such as methylbiphenyl, propylbiphenyl and octylbiphenyl; naphthalene; alkylnaphthalenes; diphenyl ether; and, polysubstituted aromatic compounds having at least one position unsubstituted, the substituents being of an inert nature in this process. The above examples, however, do not limit the scope of this invention. In general, any hydrocarbon of the benzene or naphthalene series that can be oxidatively coupled by $Pd^{2+}$ in the prior art can be suitably used here, and the products thus obtained are similar to those found in said prior art methods.

The catalyst is $Pd^{2+}$, which may be prepared in situ by the oxidation of palladium powder by the oxidizer used.

Suitably, the oxidizers are soluble sulfates of $Fe^{3+}$, $V^{4+}$ and $V^{5+}$. Anions other than sulfate could be also used, as they would effectively be replaced by $SO_4^{--}$ upon contact with the $H_2SO_4$ in the system.

The most useful acid medium is $H_2SO_4$ in a normality range from about 0.5 to 24 N, preferably about 2–10 N, the optimum being about 6 N.

It is necessary to maintain a sufficient pressure to keep the reactants in liquid phase. The temperature is suitably from about 100° to 400° C., and preferably from about 200° to 250° C.

The molar ratio of palladium to oxidizing agent is not critical and suitably varies from about 0.10 to 1.0. Only a small amount of palladium is necessary, since it is constantly reoxidized to the catalytic state, that is, $Pd^{2+}$. Therefore, this system is a regenerative one. Of course, the oxidizer can be added as needed, either continuously or intermittently.

SPECIFIC EMBODIMENTS

Following is an example of the general experimental method of the instant invention, along with specific results thereof, although the latter are in no way intended to limit the invention.

All reactions were carried out in sealed borosilicate glass ampoules, using 6 N $H_2SO_4$ as the medium. The materials were added and the free space purged with argon. A minimum of 30% free space was allowed for liquid expansion. The ampoules were cooled in Dry Ice, sealed, and placed in a rocking iron bomb which was then capped and pressurized by nitrogen to about 500 to 100 p.s.i.g. for runs at about 250° C. or less, and to about 2000 p.s.i.g. for runs at about 300° C. The bomb was cooled rapidly by plunging it into cold water after the reaction terminated.

The ampoules were cooled with Dry Ice before being opened. In some experiments, gas samples were obtained and analyzed by mass spectrometry. The organic products of the runs were separated from the aqueous layer and analyzed by a gas chromatographic method.

The conditions and results of these experiments are summarized in the table below.

The column labeled II expresses the amount of oxidant consumed in terms of mmoles of $Pd^{2+}$. In the polymerization reaction, $Pd^{2+}$ is reduced to $Pd^0$, and $Fe^{3+}$ (in reoxidizing $Pd^0$ to $Pd^{2+}$ is reduced to $Fe^{2+}$. Therefore, 1 mole of $Pd^{2+}$ or 2 moles of $Fe^{3+}$ are necessary for each carbon-carbon bond formed. The amount of oxidant consumed is determined by subtracting the amount of unused oxidant (found by titration) from the initial amount.

| Exp. No. | Monomer | amt./ mmoles | $Pd^{3+}$/ mmoles | Oxidant | amt./ mmoles | Temp. (deg.) | I | II | III, percent | Amount monomer recovered, mmoles | Percent monomer accounted for |
|---|---|---|---|---|---|---|---|---|---|---|---|
| 1 | Benzene | 20.20 | 2.58 | None | | 200 | 0.21 | 2.58 | 8.1 | 19.5 | 97.5 |
| 2 | do | 22.45 | 0.05 | None | | 200 | 0.021 | 0.05 | 42 | 21.7 | 97.3 |
| 3 | do | 22.19 | | $Fe^{3+}$ | 5.10 | 200 | None | 0.05 | | 22.3 | 100 |
| 4 | do | 20.65 | 0.05 | $Fe^{3+}$ | 5.05 | 200 | 1.27 | 1.55 | 82 | 18.3 | 100 |
| 5 | do | 10.96 | 0.05 | $Fe^{3+}$ | 3.03 | 310 | 0.78 | 1.56 | 50 | 8.9 | 94.3 |
| 6 | Phenyl ether | 9.98 | 0.10 | $Fe^{3+}$ | 5.05 | 200 | 0.25 | 1.01 | 24.8 | 9.5 | 100 |
| 7 | Benzene | 19.60 | 0.01 | $Fe^{3+}$ | 5.05 | 200 | 0.31 | 0.56 | 55.4 | 19.1 | 100 |
| 8 | Biphenyl | 10.11 | 0.10 | $Fe^{3+}$ | 5.05 | 200 | 0.25 | 0.55 | 45.5 | 9.6 | 98.8 |

I. Carbon-carbon bonds produced through polymerization (mmoles).
II. Oxidant reduced (mmoles) as $Pd^{2+}$ equivalent.
III. Polymerization yield (I/II×100).

We claim:

1. A method of polymerizing by oxidation coupling a hydrocarbon or substituted hydrocarbon of the benzene or naphthalene series, wherein any substituents are inert in the process, comprising contacting the hydrocarbon, in the liquid phase, at 100° to 400° C., with a palladium catalyst and a sulfate salt of $Fe^{3+}$, $V^{4+}$ or $V^{5+}$, in aqueous sulfuric acid.

2. The method of claim 1 wherein the inert substituents are carboxyl, phenyl, alkyl, hydroxyl, phenoxy, alkoxy or dialkylamino groups.

3. The method of claim 2 wherein the inert substituents are alkyl groups of from one to eight carbon atoms.

4. The method of claim 2 wherein the inert substituents are alkoxy groups of from one to eight carbon atoms.

5. The method of claim 2 wherein the inert substituents are dialkylamino groups having from one to eight carbon atoms in each alkyl group.

6. The method of claim 1 wherein the oxidizing agent is $Fe_2(SO_4)_3$.

7. The method of claim 1 wherein the temperature is from 200° to 250° C.

8. The method of claim 1 wherein the aqueous $H_2SO_4$ is from 0.5 normal to 24.0 normal.

9. The method of claim 1 wherein the molar ratio of palladium to sulfate salt is from 0.01 to 1.00.

References Cited

FOREIGN PATENTS 1,000,679   8/1965   Great Britain.

SAMUEL H. BLECH, Primary Examiner

U.S. Cl. X.R.

260—47

PO-1050
(5/69)

UNITED STATES PATENT OFFICE
CERTIFICATE OF CORRECTION

Patent No. 3,494,877          Dated Feb. 10, 1970

Inventor(s) Ludo K. Frevel et al

It is certified that error appears in the above-identified patent and that said Letters Patent are hereby corrected as shown below:

In Col. 2, line 37, delete "0.10" and insert --0.01--; line 56, delete "100" and insert --1000--.

SIGNED AND
SEALED
JUL 14 1970

(SEAL)
Attest:

Edward M. Fletcher, Jr.
Attesting Officer

WILLIAM E. SCHUYLER, JR.
Commissioner of Patents